(12) United States Patent
Samsonov

(10) Patent No.: US 9,568,330 B2
(45) Date of Patent: Feb. 14, 2017

(54) METHOD OF GENERATING A SUGGESTED NAVIGATION ROUTE USING OFF-ROAD TRAIL DATA PROVIDED BY USER, AND RELATED NAVIGATION DEVICE

(71) Applicant: Alexey Samsonov, Taoyuan (TW)

(72) Inventor: Alexey Samsonov, Taoyuan (TW)

(73) Assignee: MITAC INTERNATIONAL CORP., Taoyuan (TW)

( * ) Notice: Subject to any disclaimer, the term of this patent is extended or adjusted under 35 U.S.C. 154(b) by 0 days.

(21) Appl. No.: 14/719,281

(22) Filed: May 21, 2015

(65) Prior Publication Data

US 2016/0341562 A1 Nov. 24, 2016

(51) Int. Cl.
*G01C 21/36* (2006.01)

(52) U.S. Cl.
CPC .................. *G01C 21/3605* (2013.01)

(58) Field of Classification Search
CPC ............... G01C 21/36; G01C 21/3605
USPC ........................................................ 701/426
See application file for complete search history.

(56) References Cited

U.S. PATENT DOCUMENTS

| | | | | |
|---|---|---|---|---|
| 8,655,591 B2* | 2/2014 | Van Hende | ............ | G01C 21/20 701/426 |
| 8,694,240 B1* | 4/2014 | Lookingbill | ............ | G01C 21/00 455/456.1 |
| 9,014,966 B2* | 4/2015 | Taylor | ................. | B60C 23/0408 340/525 |
| 2010/0292914 A1* | 11/2010 | Vepsalainen | ....... | G01C 21/3453 701/532 |
| 2012/0259541 A1* | 10/2012 | Downey | ............ | G01C 21/3676 701/433 |
| 2013/0325340 A1* | 12/2013 | Forstall | .................. | G01C 21/00 701/533 |

* cited by examiner

*Primary Examiner* — Atul Trivedi
(74) *Attorney, Agent, or Firm* — Winston Hsu; Scott Margo

(57) ABSTRACT

A method of generating a suggested navigation route with a navigation device includes storing in a memory of the navigation device a map database containing names and locations of roads in a road network and off-road trail data containing locations of at least one off-road trail provided by a user of the navigation device, and merging off-road segments of the off-road trail with the roads of the road network to create a combined map database containing off-road segments and road segments. The method further includes receiving a request from the user for generating navigation directions to a destination location input by the user, generating the suggested navigation route using data stored in the combined map database, the suggested navigation route containing a combination of off-road segments and road segments, and providing navigation assistance to the user for guiding the user along the suggested navigation route.

20 Claims, 5 Drawing Sheets

METHOD OF GENERATING A SUGGESTED NAVIGATION ROUTE USING OFF-ROAD TRAIL DATA PROVIDED BY USER, AND RELATED NAVIGATION DEVICE

BACKGROUND OF THE INVENTION

1. Field of the Invention

The invention relates to generating navigation routes using user-supplied trail data, and more particularly, to generating a suggested navigation route using a combination of roads belonging to a road network and off-road trail data provided by a user.

2. Description of the Prior Art

Global Positioning System (GPS) based navigation devices are well known and are widely employed as in-car navigation devices. Common functions of a navigation device include providing a map database for generating navigation instructions that are then shown on a display of the navigation device. These navigation devices are often mounted on or in the dashboard of a vehicle using a suction mount or other mounting means.

The term "navigation device" refers to a device that enables a user to navigate to a pre-defined destination. The device may have an internal system for receiving location data, such as a GPS receiver, or may merely be connectable to a receiver that can receive location data. The device may compute a route itself, or communicate with a remote server that computes the route and provides navigation information to the device, or a hybrid device in which the device itself and a remote server both play a role in the route computation process. Portable GPS navigation devices are not permanently integrated into a vehicle but instead are devices that can readily be mounted in or otherwise used inside a vehicle. Generally (but not necessarily), they are fully self-contained—i.e. include an internal GPS antenna, navigation software and maps and can hence plot and display a route to be taken.

Personal navigation devices are becoming more popular, and many variations of personal navigation devices and navigation applications have been developed. In each variant, geographical coordinates are received, and then the user's position on a map can be shown as well as where the user has traveled and where the user is heading.

For consumer products, there are three popular kinds of applications using navigation devices. First, vehicle navigation applications are widely used for offering navigation guidance to a user driving a vehicle. Second, outdoor applications allow users to store their locations as waypoints and remember history of movements as multi-segment "bread-crumb" tracks. Third, fitness applications, such as those used by runners and bicyclists, can record tracks, calculate distances traveled, speeds, and calories burned, and can also offer some navigation assistance.

Despite the wide variety of applications using navigation devices, not every user may find an application which satisfies the user's requirements during a particular activity. For instance, the user may use a vehicle navigation application to guide the user to a trail head of a hiking trail. The user may then use an outdoor application to record the user's hiking activity. The user might also want to load the hiking activity data into a fitness application in order to determine how many calories the user has burned.

Unfortunately, it is very inconvenient to need to switch between different applications in order to perform different tasks. Thus, there is a growing need to combining different features together into more complete applications.

SUMMARY OF THE INVENTION

It is therefore one of the primary objectives of the claimed invention to disclose a method of generating a suggested navigation route using a combination of roads belonging to a road network and off-road trail data provided by a user, and a related navigation device.

According to an exemplary embodiment of the claimed invention, a method of generating a suggested navigation route with a navigation device is disclosed. The method includes storing in a memory of the navigation device a map database containing names and locations of roads in a road network, storing in the memory of the navigation device off-road trail data containing locations of at least one off-road trail provided by a user of the navigation device, and merging off-road segments of the at least one off-road trail provided by the user with the roads of the road network to create a combined map database containing off-road segments and road segments. The method further includes receiving, with the navigation device, a request from the user for generating navigation directions to a destination location input by the user, generating the suggested navigation route using data stored in the combined map database, the suggested navigation route containing a combination of off-road segments and road segments, and providing navigation assistance to the user for guiding the user along the suggested navigation route.

According to another exemplary embodiment of the claimed invention, a navigation device for generating a suggested navigation route is disclosed. The navigation device includes a memory for storing a map database containing names and locations of roads in a road network, and for storing off-road trail data containing locations of at least one off-road trail provided by a user of the navigation device. The navigation device also includes a processor for merging off-road segments of the at least one off-road trail provided by the user with the roads of the road network to create a combined map database containing off-road segments and road segments, a user interface for receiving a request from the user for generating navigation directions to a destination location input by the user, and routing software for generating the suggested navigation route using data stored in the combined map database, the suggested navigation route containing a combination of off-road segments and road segments, the routing software providing navigation assistance to the user for guiding the user along the suggested navigation route.

It is an advantage that the present invention is not limited to selecting roads contained in an existing road network when generating the suggested navigation route. The off-road segments of the off-road trails provided by the user are also considered when generating the suggested navigation route. Therefore, an optimum navigation route can be generated that takes in to account both road segments and off-road segments. Furthermore, the off-road segments taken from the off-road trails provided by the user are trails known to the user, and may offer significant savings in time and distance compared to sticking with paved roads.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
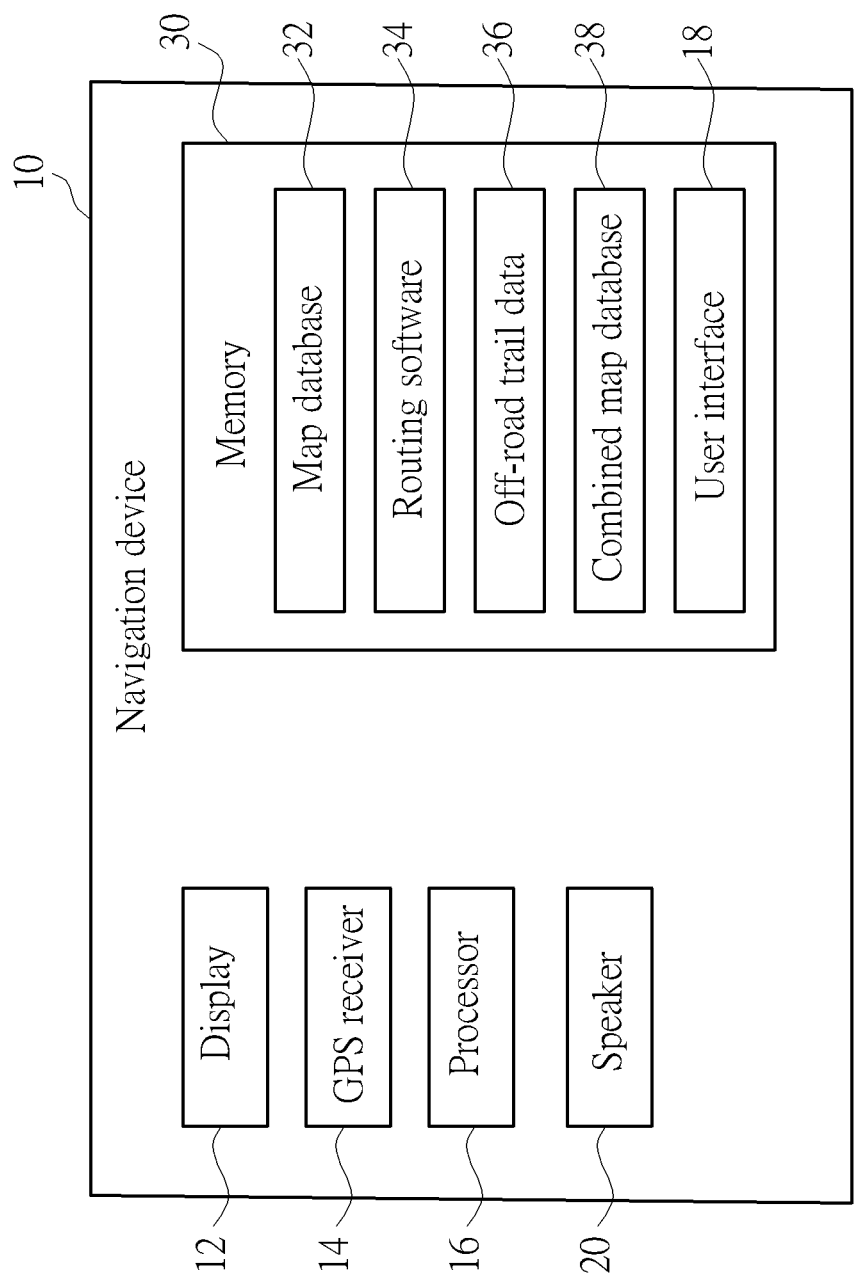
FIG. 1 is a functional block diagram of a navigation device according to the present invention.

Please refer to FIG. 1. FIG. 1 is a functional block diagram of a navigation device 10 according to the present invention. The navigation device 10 contains a display 12 which can be a touch sensitive display, a GPS receiver 14 for receiving the current geographical location of the navigation device 10, a processor 16 for controlling operation of the navigation device 10 and executing software of the navigation device 10, a speaker 20, and memory 30. The memory 30 is used to store a map database 32, routing software 34, off-road trail data 36 provided by the user, a combined map database 38, and a user interface 18.

The navigation device 10 may be a personal navigation device, commonly referred to as a "GPS device", an in-dash navigation device, a mobile phone such as a "smartphone", or any other computing device that is capable of executing navigation software.

The navigation device 10 of the present invention is best suited for use in an off-road vehicle that is capable of driving on regular paved roads, unpaved trails, and even off of any established road or trail. An example of this type of off-road vehicle is an all-terrain vehicle (ATV). The present invention simplifies the generation of a suggested navigation route for the off-road vehicle by using both paved roads contained in an existing road network as well as off-road segments of off-road trails provided by the user when generating the suggested navigation route.

Referring back to FIG. 1, a user is able to store one or more off-road trails in the off-road trail data 36 section of memory 30. These off-road trails are typically off-road (unpaved) trails that the user has experience traveling on, and may include favorite off-road trails. The user provides the off-road trail data 36 by loading files, such as files storing tracks in the GPS eXchange (GPX) format, into the memory 30. The map database 32 contains a listing of all roads in a road network, along with the corresponding names and locations of the roads. The roads in the map database 32 are mostly paved roads, and may also include other roads such as dirt roads that are drivable by most or all vehicles.

One key difference between the present invention and the prior art is the processor 16 of the present invention merges off-road segments of the off-road trails stored in the off-road trail data 36 with the roads stored in the map database 32 to create the combined map database 38 that contains both off-road segments and road segments. Although the combined map database 38 contains both off-road segments and road segments, each of these segments will preferably still have a corresponding a field in the combined map database 38 indicating whether the segments are off-road segments or road segments. When the processor 18 merges the off-road segments of the off-road trails with the roads stored in the map database 32, the processor 18 first analyzes the off-road trails of the off-road trail data 36 to determine if any portions of the off-road trails overlap the roads stored in the map database 32. Portions of the off-road trails that overlap the roads stored in the map database 32 are ignored since they are already part of the road network in the map database 32, and are not added to the combined map database 38. Similarly, if two different off-road trails contain overlapping sections, the overlapping sections are only considered for inclusion into the combined map database 38 once, and are ignored for all subsequently analyzed off-road trails in order to avoid redundant entries. In addition to containing the off-road segments and road segments, the combined map database 38 also stores nodes that indicate connections between the off-road segments and the road segments.

When the user requests navigation assistance from the navigation device 10 in order to ask directions to a destination location input by the user, the navigation device 10 may use both the off-road segments and the road segments stored in the combined map database 38 to generate a suggested navigation route for the user. Depending on what type of vehicle the user is operating, and where the user's starting location and destination location are positioned, the suggested navigation route may contain only road segments, only off-road segments, or a combination of both road segments and off-road segments. Once the suggested navigation route is generated, the navigation device 10 can provide navigation assistance to the user for guiding the user along the suggested navigation route to the destination location.

Road segments and off-road segments can be assigned different weights, where higher weights correspond to more optimal road segments in terms of typical driving speed or road grade. Usually, off-road segments are assigned lower weights than the weights of road segments since off-road segments can only be driven on at lower speeds compared to normal road segments. If the user is operating an off-road vehicle and has indicated this vehicle type in the settings of the navigation device 10, both off-road segments and road segments will have positive weights. However, if the user is operating a vehicle that cannot be driven off-road and has indicated this vehicle type in the settings of the navigation device 10, the weights of the off-road segments will be set equal to zero since the off-road segments are not available to this type of vehicle.

Once the combined map database 38 has been created and the user uses the merged data contained in the combined map database 38 for generating the suggested navigation route, the navigation device 10 will provide turn-by-turn navigation instructions to the user as the user follows the suggested navigation route to the destination location. The navigation device 10 can issue audible and/or visual instructions to the user when the user approaches an intersection, approaches an upcoming turn or sharp turn in the road, changes from a paved road segment to an off-road segment, changes from an off-road segment to a paved road segment, and so on. If the suggested navigation route has a sharp turn in a first road being driven at a point that does not involve an intersection with a second road, and if the sharp turn is greater than a threshold angle, an alert can be given to the user for indicating this fact.

In the following description, an example will be given that shows how the present invention can generate an optimum suggested navigation route that contains a combination of off-road segments and road segments.

Figure 2:
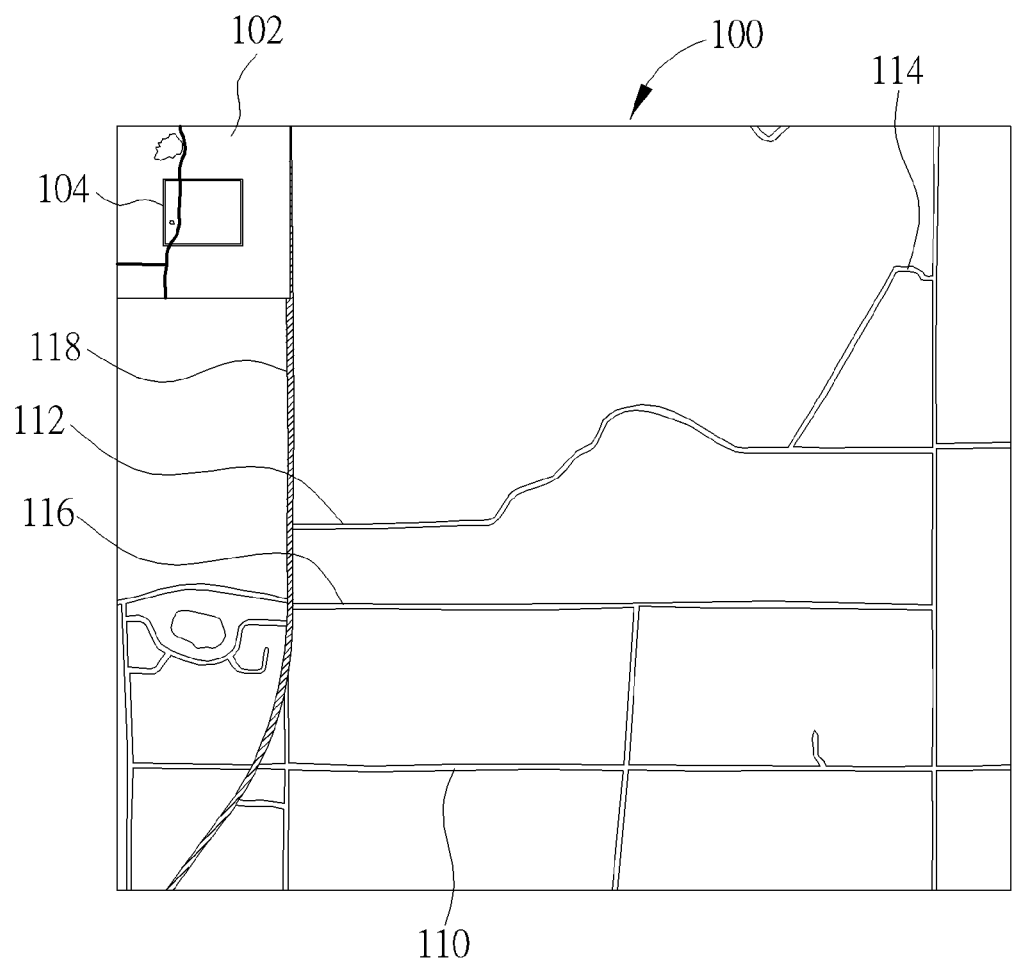
FIG. 2 shows a map with a plurality of roads.

Please refer to FIG. 2. FIG. 2 shows a map 100 with a plurality of roads including roads 110, 112, 114, 116, and 118. The area of the map 100 corresponds to the area enclosed in box 104 shown in a zoomed-out map 102 in the upper-left corner of the map 100. The map 100 is intended for vehicle navigation and the roads shown in the map 100 are drivable by all or nearly all vehicles. The map 100 has all streets, highways and freeways preliminarily processed, so all segments are connected to each other properly. For each connection (or node), turns rules are set, all segments have corresponding weights to calculate routing, etc.

Figure 3:
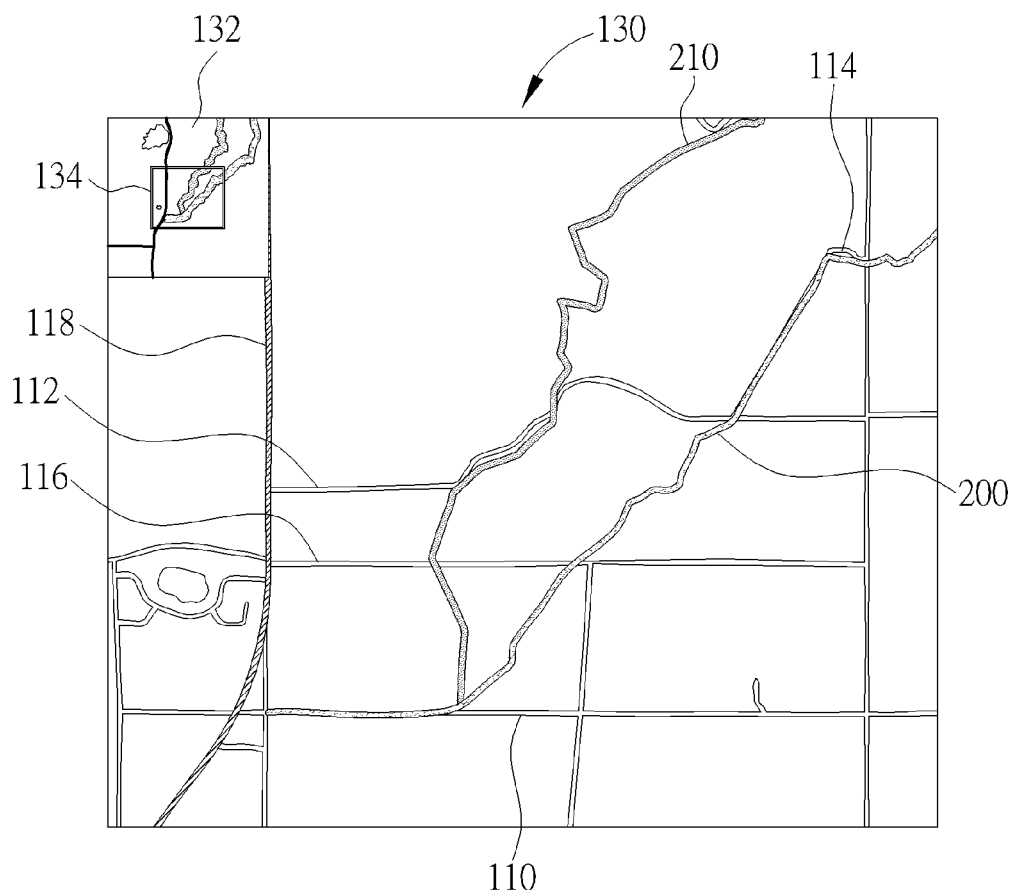
FIG. 3 shows a map containing two off-road trails provided by the user.

Please refer to FIG. 3. FIG. 3 shows a map 130 showing the same roads 110, 112, 114, 116, and 118 shown in the map 100 of FIG. 2. The area of the map 130 corresponds to the area enclosed in box 134 shown in a zoomed-out map 132 in the upper-left corner of the map 130. In addition, the map 130 also contains two off-road trails 200, 210 provided by the user. The off-road trail 200 contains segments overlapping the road 110 as well as the road 114, whereas the off-road trail 210 contains a segment overlapping the road 112. As stated above, these overlapping segments of the off-road trails 200, 210 are not redundantly added to the combined map database 38 since they are already part of the existing map database 32. However, all other non-overlapping segments of the off-road trails 200, 210, which contain the off-road segments, are added to the combined map database 38. The off-road trails 200, 210 may be unpaved trails often traveled on by the user to shorten the user's drive through a rural area.

Figure 4:
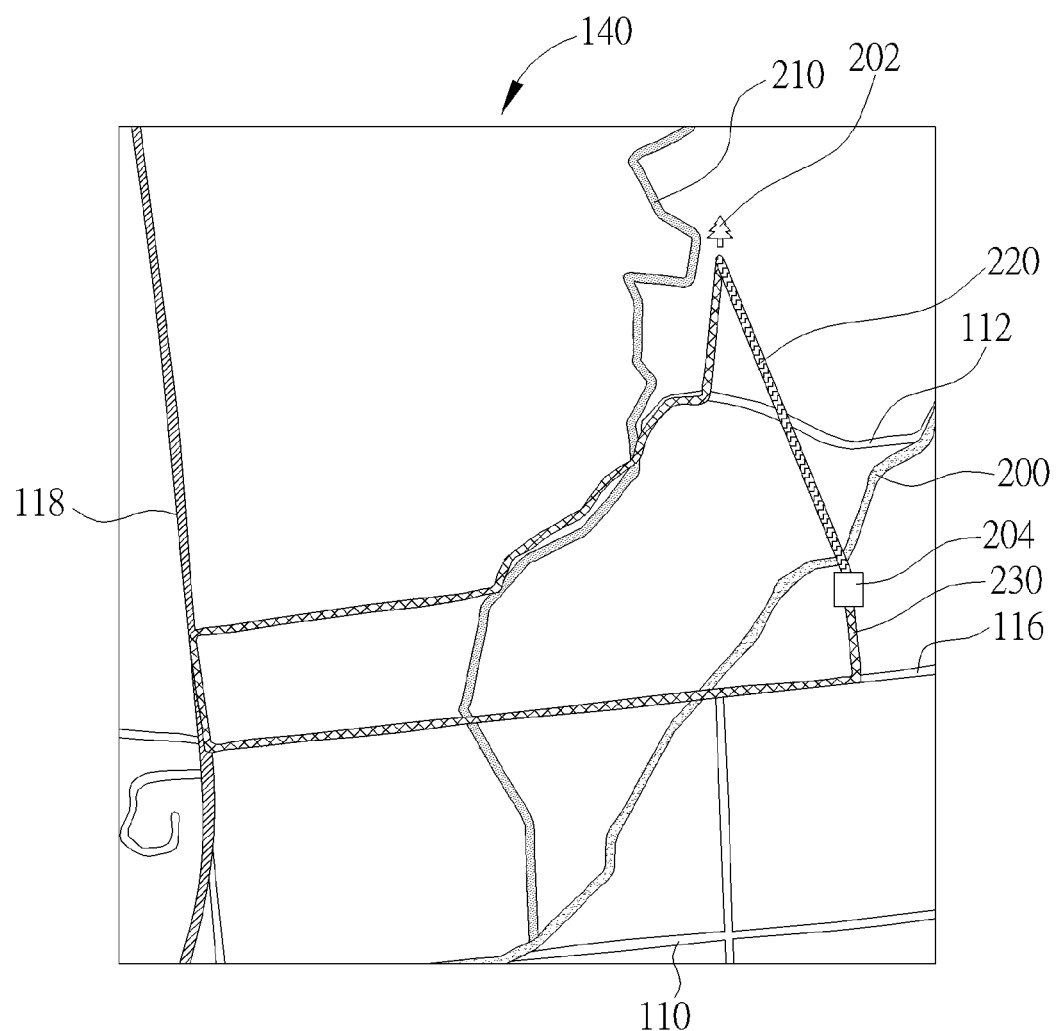
FIG. 4 shows a map illustrating an example where the user is wishing to navigate from a start point to a destination location.

Please refer to FIG. 4. FIG. 4 shows a map 140 illustrating an example where the user is wishing to navigate from a start point 202 to a destination location 204. If it was possible to travel as the crow flies, then route 220 would be the shortest distance between the start point 202 and the destination location 204. If a user is not allowed to travel on the off-road trails 200, 210, and is mainly limited to traveling on the normal roads, then the user would be forced to travel on route 230. This route 230 involves traveling off-road a short while from the start point 202 to road 112, then traveling on road 112 until intersecting with road 118, then traveling on road 118 until intersecting with road 116, then traveling on road 116 until approaching the destination location 204, and then traveling off-road a short while from road 116 to the destination location 204. Route 230 is obviously considerably longer than route 220 because route 230 involves mainly traveling on normal roads. However, route 220 is most likely not feasible for travel with an off-road vehicle due to obstructions or non-suitable terrain. Please note that in FIG. 4, neither route 220 nor route 230 make use of the off-road segments of the off-road trails 200, 210.

Figure 5:
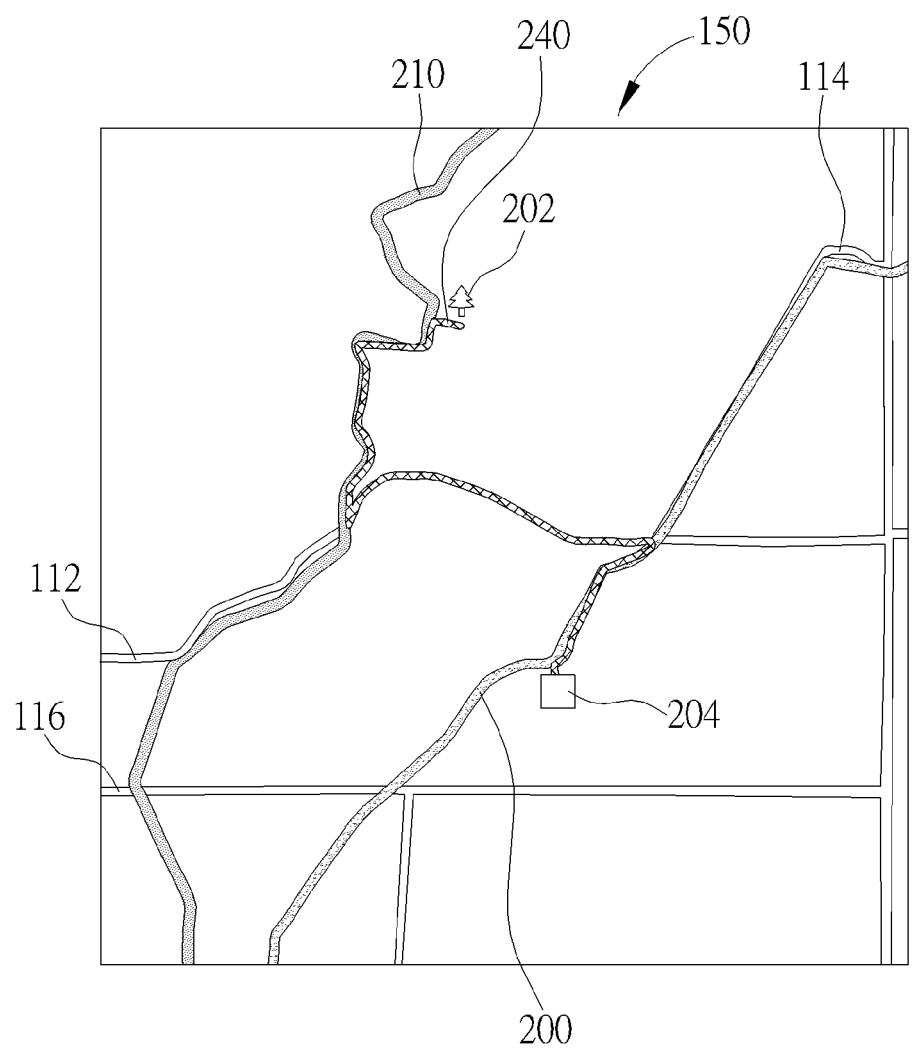
FIG. 5 shows a map illustrating another scenario where the user wishes to navigate from the start point to the destination location while making use of the off-road segments of the off-road trails.

Please refer to FIG. 5. FIG. 5 shows a map 150 illustrating another scenario where the user wishes to navigate from the start point 202 to the destination location 204 while making use of the off-road segments of the off-road trails 200, 210. In this scenario, a route 240 is created using both normal road segments and the off-road segments of the off-road trails 200, 210. The route 240 involves traveling off-road a short while on a section not pre-defined by the user from the start point 202 to off-road trail 210, then traveling on off-road trail 210 until intersection with road 112, then traveling on road 112 until intersecting with off-road trail 200, then traveling on off-road trail 200 until approaching the destination location 204, and then traveling off-road a short while on a section not pre-defined by the user from off-road trail 200 to the destination location 204.

As can be seen from comparing route 230 in FIG. 4 to route 240 in FIG. 5, the route 230 using normal roads is considerably longer than the route 240 using both normal roads and off-road trails 200, 210 that are defined by the user. Therefore, a great deal of time can be saved by making use of the off-road segments of the off-road trails 200, 210. Since the user is already familiar with the off-road trails 200, 210, traveling on the off-road trails 200, 210 does not present a problem for the user, and having the additional off-road segments of the off-road trails 200, 210 available to the user allows the suggested navigation route to be created in order to optimize distance and/or travel time.

In summary, the present invention is able to generate optimum suggested navigation routes by considering off-road segments of the off-road trails provided by the user in addition to normal roads contained in an existing road network. In this way, more road options are available to the navigation device 10 when generating the suggested navigation route.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of generating a suggested navigation route with a navigation device, the method comprising:
    storing in a memory of the navigation device a map database containing names and locations of roads in a road network;
    storing in the memory of the navigation device off-road trail data containing locations of at least one off-road trail provided by a user of the navigation device, the user storing the off-road trail data in the memory by loading at least one file into the memory;
    merging off-road segments of the at least one off-road trail provided by the user with the roads of the road network to create a combined map database containing off-road segments and road segments;
    receiving, with the navigation device, a request from the user for generating navigation directions to a destination location input by the user;
    generating the suggested navigation route using data stored in the combined map database, the suggested navigation route containing a combination of off-road segments and road segments, and the suggested navigation route being generated for guiding the user as the user operates a motor vehicle; and
    providing navigation assistance to the user for guiding the user along the suggested navigation route while the user operates the motor vehicle.

2. The method of claim 1, wherein when merging off-road segments of the at least one off-road trail provided by the user with the roads of the road network to create the combined map database, portions of the at least one off-road trail provided by the user overlapping with the roads of the road network are ignored, and nodes connecting the off-road segments to the road segments are created.

3. The method of claim 1, wherein providing navigation assistance to the user comprises providing turn-by-turn navigation instructions to the user when making a turns and approaching intersections.

4. The method of claim 1, wherein providing navigation assistance to the user comprises providing turn-by-turn navigation instructions to the user when transitioning from road segments to off-road segments of the suggested navigation route and when transitioning from off-road segments to road segments of the suggested navigation route.

5. The method of claim 1, wherein the off-road segments are assigned different weights than weights of the road segments in the combined map database.

6. The method of claim 5, wherein the off-road segments are assigned lower weights than weights of the road segments.

7. The method of claim 1, wherein the suggested navigation route is generated for the user to follow while the user is operating an off-road motor vehicle.

8. The method of claim 7, wherein the suggested navigation route is an optimum route for the off-road motor vehicle containing the combination of off-road segments and road segments.

9. The method of claim 1, wherein the navigation device is a personal navigation device.

10. The method of claim 1, wherein the navigation device is a mobile phone.

11. A navigation device for generating a suggested navigation route, the navigation device comprising:
- a memory for storing a map database containing names and locations of roads in a road network, and for storing off-road trail data containing locations of at least one off-road trail provided by a user of the navigation device, the user storing the off-road trail data in the memory by loading at least one file into the memory;
- a processor for merging off-road segments of the at least one off-road trail provided by the user with the roads of the road network to create a combined map database containing off-road segments and road segments;
- a user interface for receiving a request from the user for generating navigation directions to a destination location input by the user; and
- routing software for generating the suggested navigation route using data stored in the combined map database, the suggested navigation route containing a combination of off-road segments and road segments, and the suggested navigation route being generated for guiding the user as the user operates a motor vehicle, the routing software providing navigation assistance to the user for guiding the user along the suggested navigation route while the user operates the motor vehicle.

12. The navigation device of claim 11, wherein when merging off-road segments of the at least one off-road trail provided by the user with the roads of the road network to create the combined map database, the processor ignores portions of the at least one off-road trail provided by the user that overlap with the roads of the road network, and creates nodes connecting the off-road segments to the road segments.

13. The navigation device of claim 11, wherein when providing navigation assistance to the user, the routing software provides turn-by-turn navigation instructions to the user when making a turns and approaching intersections.

14. The navigation device of claim 11, wherein when providing navigation assistance to the user, the routing software provides turn-by-turn navigation instructions to the user when transitioning from road segments to off-road segments of the suggested navigation route and when transitioning from off-road segments to road segments of the suggested navigation route.

15. The navigation device of claim 11, wherein the off-road segments are assigned different weights than weights of the road segments in the combined map database.

16. The navigation device of claim 15, wherein the off-road segments are assigned lower weights than weights of the road segments.

17. The navigation device of claim 11, wherein the suggested navigation route is generated for the user to follow while the user is operating an off-road motor vehicle.

18. The navigation device of claim 17, wherein the suggested navigation route is an optimum route for the off-road motor vehicle containing the combination of off-road segments and road segments.

19. The navigation device of claim 11 being a personal navigation device.

20. The navigation device of claim 11 being a mobile phone.

* * * * *